April 17, 1934.  J. F. LAWSON  1,955,301
DRIER
Filed Jan. 31, 1931    2 Sheets-Sheet 1
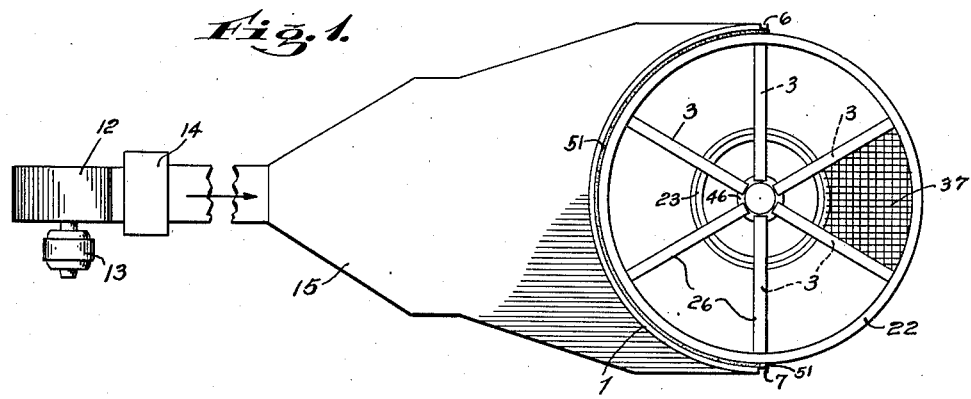
Fig. 1.
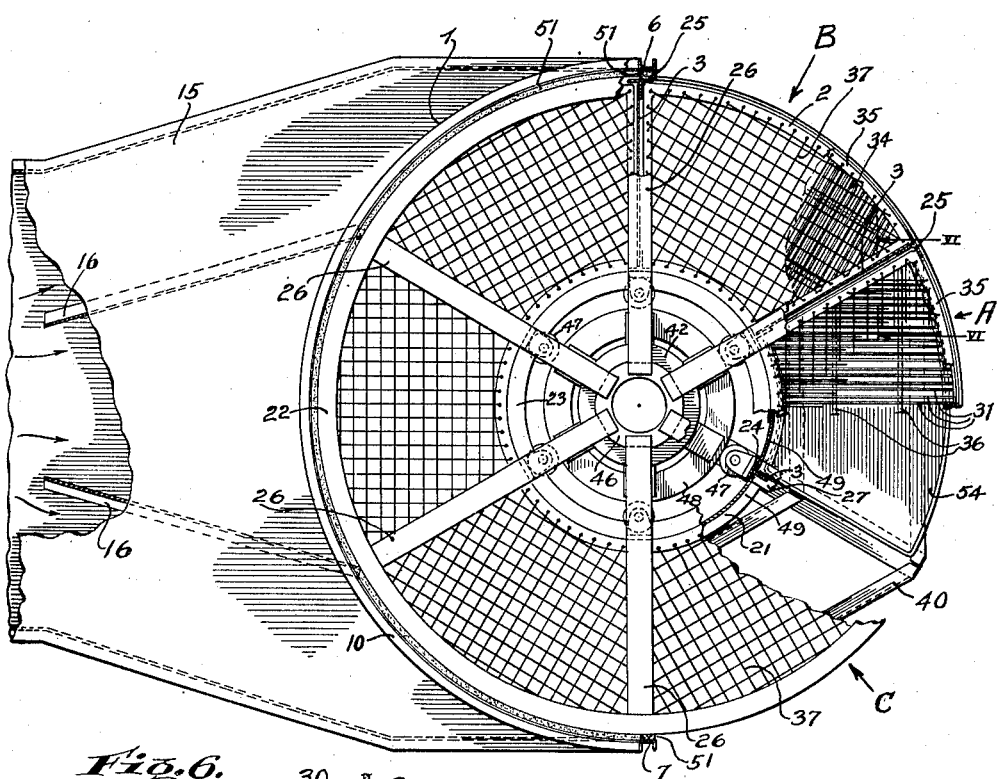
Fig. 2.
Fig. 6.
INVENTOR.
John F. Lawson
BY Jeffery Kimball Eggleston
ATTORNEYS.

April 17, 1934.  J. F. LAWSON  1,955,301
DRIER
Filed Jan. 31, 1931   2 Sheets-Sheet 2
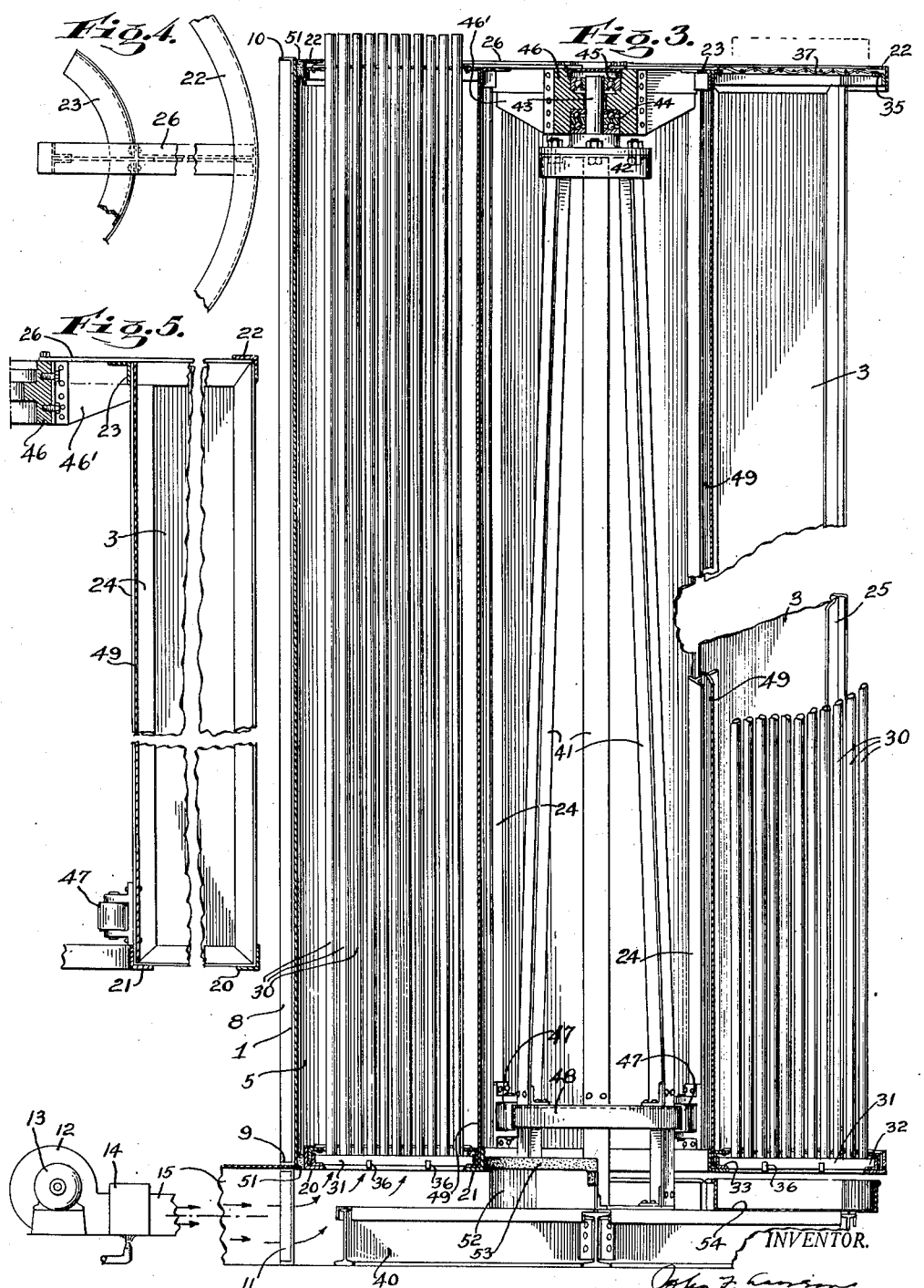

Patented Apr. 17, 1934

1,955,301

UNITED STATES PATENT OFFICE 1,955,301

DRIER

John F. Lawson, Brooklyn, N. Y., assignor to Steel and Tubes, Inc., a corporation of Ohio Application January 31, 1931, Serial No. 512,515

5 Claims. (Cl. 34—26)

The object of this invention is to provide an improved apparatus for drying newly painted articles, and especially for drying pipes and tubes painted internally.

In the accompanying drawings illustrating a pipe or tube drier embodying the preferred form of my invention: Fig. 1 is a plan view of the machine, certain details being omitted from the figure as will be understood as this description proceeds. Fig. 2 on a larger scale, is a plan view, partly in section, of and adjacent the rack of the machine of Fig. 1. Fig. 3 is a vertical section of the rack and oven, tubes being and to be dried being also shown. Figs. 4 and 5 are details of construction of the rack, Fig. 4 being a plan view and Fig. 5 an elevation and partly in section. Fig. 6 is a sectional detail on the line VI—VI of Fig. 2, illustrating the reticulated flooring of the rack on a larger scale.

According to my invention, the drying apparatus consists essentially of an oven 1, and a rotatable rack 2 projecting more or less into the oven and divided into not less than three, and preferably at least four, sections, by means of walls 3 so placed as to close the opening in and complete the oven when the rack is at rest with one or more of the sections entirely contained within the oven. In the machine illustrated, the oven consists of a semi-cylindrical sheet metal member 5 supported, with its axis vertical, by flanged structural-metal uprights 6 and 7 at the long edges of the sheet metal member, other structural members 8 between 6 and 7, and flanged semi-circular top and bottom structural members 9 and 10. United, these structural members form a frame supporting the sheet metal 5, and which is supported on a suitable foundation which may also consist of structural members as indicated at 11 in Fig. 3. This oven is open, or ported, at the top and at the bottom. Drying air is supplied by a blower 12, driven by the motor 13, and heated in passing at the heater 14; the heater 14 is shown only diagrammatically. The heated air passes through the duct member 15 leading to the lower open end of the oven as will be understood from the drawings; distributing partitions 16 say equally spaced from each other and from the vertical side walls of the duct 15 at their left-hand ends, and at their right-hand ends equi-angularly spaced about the lower end of the oven, may be employed to distribute the air in its upward flow through the oven as may be desired.

The operation of the drier is intended to be continuous, the various sections of the rack being unloaded and reloaded with tubes separately and successively, and the steps of loading and unloading drying, and cooling going on simultaneously. To this end, division of the rack into at least three sections is necessary, in order that there may be one section available for loading and unloading the work outside the oven, a second section within the oven wherein the tubes are in the course of drying, and a third section, also outside the oven, wherein the tubes can cool, after drying, before they need to be removed from the rack. Usually however at least four sections will be preferable in order that there may be three sections outside the oven simultaneously, one which is being unloaded and loaded, one wherein the newly loaded work can stand for a little time before entering the oven to permit excess paint to drain away, and one wherein the newly dried work is cooling prior to unloading. Conveniently the rack is divided into six sections, three of which are in the oven simultaneously while three are outside the oven; such is the construction illustrated. In substance, the rack illustrated consists of a framework supporting sheet metal walls. The framework of the rack consists of concentric L-shaped rings 20 and 21 at the bottom of the rack, concentric L-shaped rings 22 and 23 at the top of the rack, six (since there are six partitions in the rack) vertical T-shaped members 24 joining the rings 21 and 23, six vertical T-shaped members 25 joining the outer rings 20 and 22, six radial T-shaped spokes 26 joining the upper rings 22 and 23, and six radial T-shaped spokes 27 joining the two lower rings 20 and 21. The six partitions 3 which divide the rack into six vertical sections consist, each, of a sheet of metal which is held in place by attachment to pairs of the vertical members 24 and 25 and pairs of the spokes 26 and 27. The flooring of the rack on which the work (here the tubes 30) is supported, is reticulated, and where the drying is by gas flow as illustrated, the rack floor is reticulated clear through so as to permit the gas to flow. To this end, parallel bars 31 are provided at the base of each section; their two ends are connected to L-shaped members 32 and 33 which rest, respectively, on the rings 20 and 21. A netting of crossed wires 34, fastened to a frame 35 (one frame for each section) is carried a little distance above the tops of the bars 31 to space the lower end of the tubes apart; the mesh of this netting is just sufficiently large to conveniently take the ends of the tubes 30 as shown best in Fig. 6. Other bars 36, at right angles to the bars 31 and resting directly or indirectly on the spokes 27, may help the bars 31 to support the tubes. As appears from Fig. 3, the tubes 30 extend vertically from the parallel bars 31; at the upper ends of the tubes, another reticulated member 37 of crossed wires, mounted in a generally similar manner, spaces the upper ends of the tubes apart. By this arrangement, the heated air blown in through the duct 15, passes upwardly both through the tubes 30 and between the tubes.

Preferably the rack is mounted by suspension, as by hanging it on a thrust bearing at or near its upper end. For this purpose from the foundation 40 for the rack (which foundation may be of structural elements, if desired, as illustrated) a column is built up of vertical T-shaped members 41 converging at their tops into a cap 42 which carries a pin 43 about which is placed a thrust bearing 44 and preferably a radial bearing 45 also, and the spokes 26 are extended inwardly to a journal member 46 in which the bearings 44 and 45 are carried. Bracket plates 46' may be added to help the spokes 26 support the weight of the loaded rack, which they do by bearing at their inner edge against the face of the journal member 46 and at their upper edge bearing underneath the webs of the spokes 26. The members 26, 47 and 23 may be joined by electric welding. The weight of the loaded rack is carried at the top of the column therefore, and to prevent the rack swaying, I provide a radial bearing between the rack and column at some distance below the top of the column. This bearing may consist of a number of vertically placed rollers 47 at the lower ends of the vertical frame members 24 and a co-operating ring 48 carried by the column posts 47. Six pieces 49 of sheet metal, extending respectively between the rings 21 and 23 and between adjacent uprights 24, form in effect a cylinder entirely enclosing the column 41; they serve to prevent the escape of air from the oven toward the column, and shield the column from the heat.

The vertical center line of the column 41 is substantially the axis of the oven wall 5 and the latter being half a cylinder, it is obvious that any two diametrical partitions 3, in co-operation with walls 49 of the rack, will serve to entirely close the open side of the oven and cause the air blown in through the duct 15 to pass upward through and between the tubes 30. To prevent the escape of air through the crevices necessarily formed between the rotary rack and the stationary oven, strips of felt or the like may be inserted as indicated at 51. To close off the oven at the bottom of the rack, a semi-circular member 52 may be provided on the foundation 40 and carry a strip of felt or the like 53 to engage with the inner rack ring 21. To catch the paint dripping from the tubes, pans 54 may be provided, at least one at the loading station (marked A in Fig. 2) and another at the draining station (marked B in Fig. 2).

For loading and unloading, the rack is stopped in some such position as illustrated in Fig. 2 wherein two of the partitions 3 will serve to complete the closure of the open side of the oven. Assuming that the device is in service and that the rack is rotatable counter-clockwise in Fig. 2, the three sections of the rack which are at the left-hand and within the oven, contain tubes which are in the process of being dried by air blown from 12 and heated at 14. After passing the tubes, the air escapes from the open top of the oven. Simultaneously, at the station marked A, newly painted tubes are being substituted for previously dried tubes. The section at station B is completely filled with newly painted tubes, which are thus left standing outside the oven temporarily (while the section at present at station A is being unloaded and reloaded) in order to give the excess of paint adequate time to drain off the tubes (into the pan 54 beneath it) before these tubes are sent into the oven. The tubes in the section at station C are dried (having just come from the oven) but are allowed to stand temporarily at this point outside the oven (while the section at A is being reloaded) in order that they may cool off sufficiently for easy handling by the operator when the time comes for unloading the section. As soon as the section now at A has been reloaded, the rack will be turned 60°; this will place the section now at B within the oven; move the section now at A to the draining station B; bring the section now at C to the loading and unloading station A; and bring one of the sections from the oven to the cooling station C. It is apparent therefore, as before indicated, that the operation with this drying apparatus is a continuous one, loading and unloading going on continuously with draining, drying and cooling.

It will be understood that my invention is not limited to the details of construction illustrated and described above except as appears hereinafter in the claims.

1. In a machine of the kind described, a rack to support the articles to be dried having substantially equi-angularly spaced walls extending axially of the rack and radially of its center line dividing the rack into sections, a rack-supporting column within the rack, the rack being rotatably suspended on the column from near the upper end of the rack, and an oven partially enclosing the rack and through which the rack rotates, characterized by the fact that a radial bearing between the rack and column is provided below the top of the column to prevent the swaying of the rack as the latter rotates.

2. In a machine for drying bars, pipes, tubes and the like, a substantially vertical rack-supporting column, a rack comprising an annular framework at the top, an annular framework at the bottom, supporting members joining the two frameworks, a wall member or members immediately outside of the column extending between said two annular frameworks, and wall members extending outwardly from said column-enclosing wall member or members dividing the rack into a number of sections, the floor of the rack being reticulated and provided with means for spacing apart the lower ends of the articles to be dried, and a reticulated means nearer the top of the rack through which the articles to be dried extend, the rack being rotatably suspended at the top of said column, bearing means between said rack and column, below the top of the column, to prevent the rack swaying as it rotates, a vertical oven partially enclosing the rack, leaving at least two sections thereof exposed and through which the rack rotates, the closure of the oven space being completed by said rack walls in each stationary position of the rack, the oven being ported top and bottom, and means for blowing a heated gas into the oven through one ported end thereof.

3. In a machine for drying pipes, a rack having a reticulated floor and walls extending axially of the rack dividing the same into at least four sections, two vertically spaced means to space the pipes apart, each of said means being provided with a plurality of openings each of which is sufficiently large to conveniently receive an end of a pipe, an oven partially enclosing the rack, leaving at least three sections exposed, and through which oven the rack is rotatable, the closure of said oven being completed by said walls in each stationary position of the rack, means to cause a flow of air through only the space enclosed by the oven, said means directing the air flow toward one of said two vertically spaced means and the air escaping from the opposite side of the other of said two means so that the air flows through said pipes and also between the pipes lengthwise of the latter, and means to heat the said air before it enters the oven.

4. The subject matter of claim 3, in combination with drip receiving pans located below at least two adjacent sections of the said three exposed sections.

5. The subject matter of claim 3, characterized by the fact that at least one of said three exposed sections is open to the vertical flow of cooling air through the pipes therein.

JOHN F. LAWSON.